United States Patent [19]

Leggett et al.

[11] Patent Number: 4,570,376

[45] Date of Patent: Feb. 18, 1986

[54] SAFETY STUNNING TIP AND TRAP RETRIEVING HOOK AND METHOD OF USE THEREOF

[76] Inventors: Clarence A. Leggett, Rte. #1, Box 79; Ronald L. Leggett, Rte. #1, Box 415, both of Boonsboro, Md. 21713

[21] Appl. No.: 610,495

[22] Filed: May 15, 1984

[51] Int. Cl.$^4$ .................................. A01M 23/24
[52] U.S. Cl. ........................ 43/96; 119/151; 294/15
[58] Field of Search ............ 43/96; 119/151, 152, 119/154; 294/15, 19 R

[56] References Cited

U.S. PATENT DOCUMENTS

| | | | |
|---|---|---|---|
| 597,987 | 1/1898 | Krabach | 294/19.1 |
| 1,772,512 | 8/1930 | Hathorn | 119/152 |
| 2,382,774 | 8/1945 | Coffin | 294/15 |
| 2,603,185 | 7/1952 | Kuhns | 119/151 |
| 4,258,447 | 3/1981 | Garcia | 294/19.1 |

*Primary Examiner*—Kuang Y. Lin
*Assistant Examiner*—Kurt Rowan
*Attorney, Agent, or Firm*—Schwartz, Jeffery, Schwaab, Mack, Blumenthal & Evans

[57] ABSTRACT

A combination stunning tip and trap retrieving hook has a tubular member for receiving a handle therein. A pair of fork-shaped members are attached to the tubular member and extend in a direction remote from the handle receiving means. A hook means is attached to each fork-shaped member trap.

1 Claim, 4 Drawing Figures

SAFETY STUNNING TIP AND TRAP RETRIEVING HOOK AND METHOD OF USE THEREOF

BACKGROUND OF THE INVENTION

1. Field of the Invention

The invention relates to a combined stunning tip and trap retrieving hook and a method of use thereof.

2. Prior Art

Various types of stunning tips have been used to stun and retain animals while releasing them from traps and the like. The stunning tip of the instant invention, for example, has been used for a number of years. There is, at the same time, a need for an associated means to retrieve traps from the water or other relatively inaccessible locations, either while restraining the animal or while the trap is free.

It is also desirable that one not have to reach in a hole or in water by hand to retrieve a trap in view of the obvious danger of being bit by an animal.

OBJECTS AND SUMMARY OF THE INVENTION

It is an object of the invention to provide a stunning tip for restraining animals and at the same time to provide means for retrieving traps.

It is further an object of the invention to provide a method of restraining or stunning an animal and being able to retrieve the trap from the water or another remote location.

In one form of the invention a handle is inserted into a hollow pipe member. Welded or otherwise attached to the pipe member are a pair of fork members extending forwardly of the handle. One or a pair of side hook members at an angle to the fork are welded or otherwise secured thereto for the purpose of retrieving the trap—either while the animal is restrained or subsequent thereto.

BRIEF DESCRIPTION OF THE DRAWINGS

The above and other objects of the invention will become more apparent from the following description when taken with the accompanying drawings, wherein.

DETAILED DESCRIPTION OF THE INVENTION

The stunning tip of the instant invention is seen generally at 1 having a length of hollow pipe member 3 which in practice is about 2" in length and is made of ¾" to 1" pipe. A handle 5 of appropriate length is seen inserted in a pipe opening 7.

Figure 1:
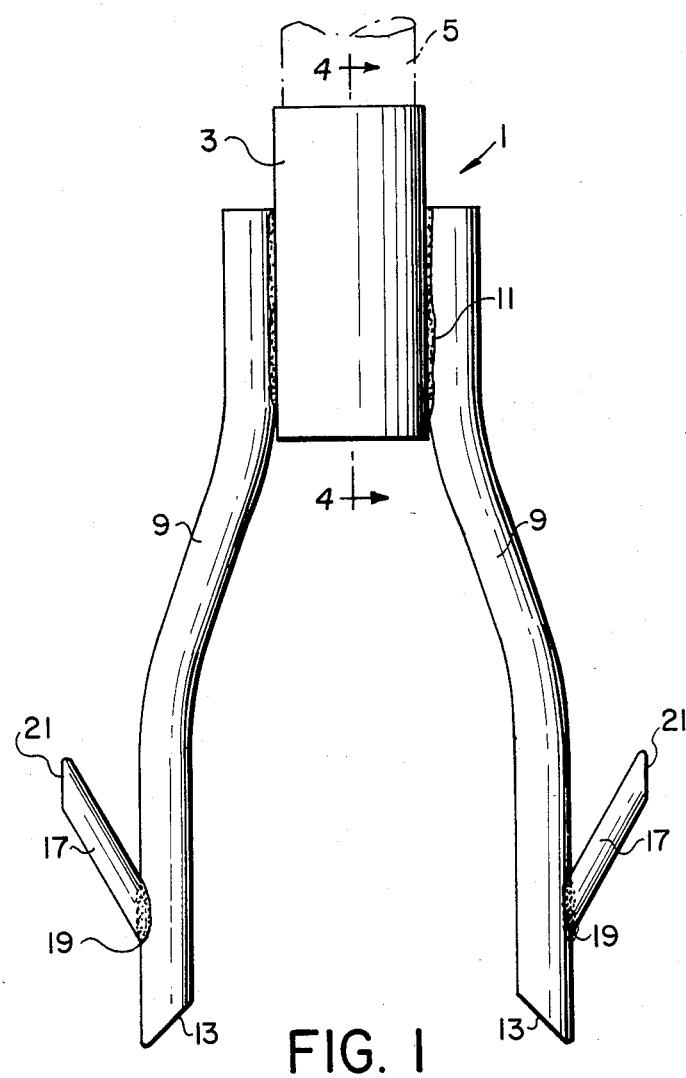
FIG. 1 is a front elevation view of a safety stunning tip and a pair of hook members thereon in accordance with the instant invention.
Figure 2:
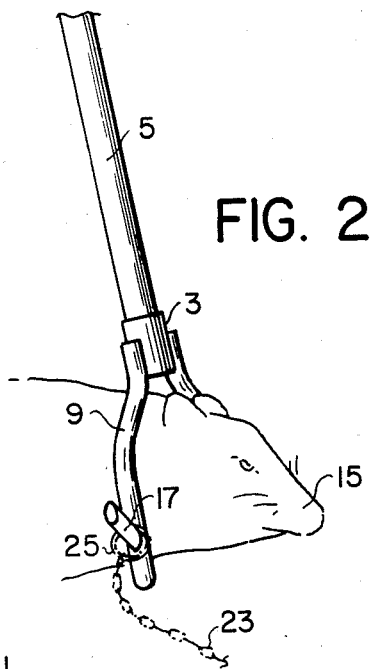
FIG. 2 is a perspective view showing the invention in use.
Figure 3:
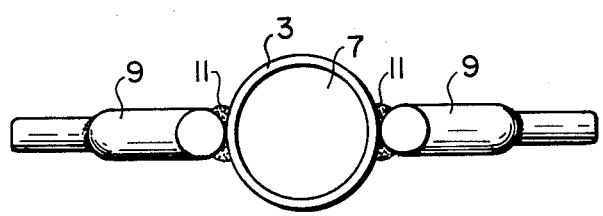
FIG. 3 is a top plan view of FIG. 1.
Figure 4:
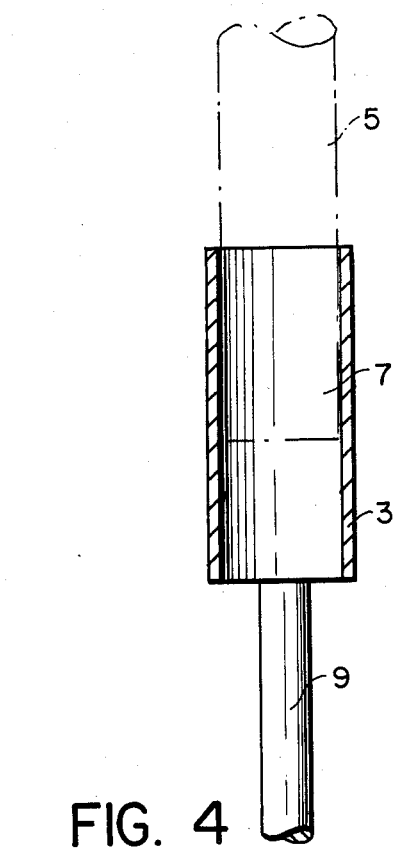
FIG. 4 is a section view taken along line 4—4 of FIG. 1.

A pair of fork-shaped members 9 are welded to pipe 3 at 11. The curved, fork-shaped members 9 are generally about 4" in length extending beyond the end of pipe 3 and have a pair of beveled ends 13. As seen in FIG. 2, an animal 15 may be restrained by use of the safety stunning tip.

On at least one of the fork members 9 is located an angled hook member 17 which is welded at 19 to member 9. The hook member 17 is welded about ¾" from the end or tip of the fork-shaped members, angled at about 30° in the direction shown and about 1" in length. The hook member 17 has a beveled end 21 which extends out about ⅜" to ½" from its respective fork-shaped member.

As seen in FIG. 2 a chain 23 which may be attached to a trap is seen having a ring 25 attached thereto and caught on member 17.

In use, the safety stunning tip is placed over the trapped dog, coon or other animal as seen in FIG. 2 so that the animal may be restrained while it is removed from the trap. Often, stray dogs, etc., are caught in traps, and it is necessary that they be released while the trapper is simultaneously protected. Also, it is advisable and necessary that the trap be retrieved, either while the animal is being released so that the animal does not run away with the trap or subsequent thereto. This is accomplished by hooking ring 25 or some other portion of the trap on element 17. Obviously, element 17 can be used to catch on any wire or other narrow portion of the trap to hold it in place, and the ring and chain member seen in FIG. 2 is merely one example of a means of holding the trap with the stunning tip and retrieving hook.

While one embodiment of the invention has been described, it will be understood that it is capable of further modification, and this application is intended to cover any variations, uses, or adaptations of the invention, following in general the principles of the invention and including such departures from the present disclosure as to come within knowledge or customary practice in the art to which the invention pertains, and as may be applied to the essential feature hereinbefore set forth and falling within the scope of the invention or the limits of the appended claims.

What is claimed is:

1. A combination stunning tip and trap retrieving hook comprising:
   (a) a tubular member including means for receiving a handle therein,
   (b) a pair of fork-shaped members attached to said tubular member and extending in a direction remote from said handle receiving means for restraining an animal, and
   (c) at least one hook means attached to a fork-shaped member for retrieving a trap,
   (d) said hook member being substantially rectilinear and angled at about 30° to said fork-shaped member, and
   (e) said hook member having a pair of generally parallel ends beveled in relation to its rectilinear length, one end being attached to said fork-shaped member; and the other end providing a pointed end to facilitate retrieving a trap.

* * * * *